(12) United States Patent
Meguro et al.

(10) Patent No.: US 10,372,955 B2
(45) Date of Patent: Aug. 6, 2019

(54) READING DEVICE AND PORTABLE DEVICE

(71) Applicant: CASIO COMPUTER CO., LTD., Tokyo (JP)

(72) Inventors: Hiromasu Meguro, Sagamihara (JP); Yasunori Chiba, Tachikawa (JP); Shinya Okumura, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/685,558

(22) Filed: Aug. 24, 2017

(65) Prior Publication Data

US 2018/0075270 A1 Mar. 15, 2018

(30) Foreign Application Priority Data

Sep. 14, 2016 (JP) .................................. 2016-179632

(51) Int. Cl.
*G06K 7/10* (2006.01)

(52) U.S. Cl.
CPC ....... *G06K 7/10881* (2013.01); *G06K 7/1092* (2013.01); *G06K 7/10544* (2013.01); *G06K 7/10722* (2013.01); *G06K 7/10861* (2013.01)

(58) Field of Classification Search
CPC .......... G06K 7/10821; G06K 7/10861; G06K 7/10881; G06K 7/1096; G06K 7/1098; G06K 7/1439; G06K 7/1443; G06K 7/1447
USPC ....................................... 235/462.45, 472.01
See application file for complete search history.

(56) References Cited

U.S. PATENT DOCUMENTS

| 5,530,619 | A | | 6/1996 | Koenck et al. | |
|---|---|---|---|---|---|
| 5,763,864 | A | | 6/1998 | O'Hagan et al. | |
| 5,801,918 | A | * | 9/1998 | Ahearn | G06K 7/10881 |
| | | | | | 235/472.01 |
| 5,872,354 | A | | 2/1999 | Hanson | |
| 5,992,744 | A | * | 11/1999 | Smith | G06K 7/10574 |
| | | | | | 235/462.07 |
| 6,164,546 | A | * | 12/2000 | Kumagai | G06K 7/10594 |
| | | | | | 235/462.32 |
| 7,222,794 | B2 | * | 5/2007 | Kumagai | G06K 7/10594 |
| | | | | | 235/462.01 |
| 7,243,850 | B2 | * | 7/2007 | Tamburrini | G06K 7/10693 |
| | | | | | 235/462.25 |

(Continued)

FOREIGN PATENT DOCUMENTS

| JP | 2005-063142 A | 3/2005 |
|---|---|---|
| WO | 92/15073 A1 | 9/1992 |

OTHER PUBLICATIONS

Extended European Search Report dated Feb. 12, 2018 received in EP Patent Application No. 17188176.6.

*Primary Examiner* — Thien M Le
*Assistant Examiner* — April A Taylor
(74) *Attorney, Agent, or Firm* — Scully Scott Murphy & Presser

(57) ABSTRACT

A reading device includes a reading unit configured to illuminate a light beam towards an object to be read, to receive reflected light thereof and to read information of the object to be read, and an imaging unit configured to capture the object to be read, as an image, wherein an illumination direction of the light beam from the reading unit and an imaging direction of the imaging unit are set to be same.

11 Claims, 6 Drawing Sheets

(56) References Cited

U.S. PATENT DOCUMENTS

| | | | |
|---|---|---|---|
| 7,334,729 B2* | 2/2008 | Brewington | G06Q 30/06 235/383 |
| D614,626 S * | 4/2010 | Dai | D14/426 |
| 8,587,595 B2* | 11/2013 | Wang | G06K 7/10722 235/462.01 |
| 8,608,071 B2* | 12/2013 | Liu | G06K 7/10851 235/440 |
| 2003/0085284 A1 | 5/2003 | Bremer et al. | |
| 2009/0159685 A1* | 6/2009 | Shi | G06K 7/10831 235/462.42 |
| 2009/0321524 A1* | 12/2009 | Bellows | G06F 1/1632 235/462.45 |
| 2010/0012726 A1* | 1/2010 | Tsi Shi | G06K 7/10702 235/455 |
| 2013/0008964 A1* | 1/2013 | Hawley | G06K 7/10851 235/472.01 |
| 2013/0015242 A1 | 1/2013 | White | |
| 2014/0014726 A1* | 1/2014 | Tsiopanos | G06K 7/0004 235/470 |
| 2014/0299665 A1* | 10/2014 | Barber | G06K 7/10722 235/462.28 |
| 2015/0178538 A1* | 6/2015 | Gerst | G06K 7/10881 235/472.01 |
| 2016/0086008 A1* | 3/2016 | Smith | G06K 7/1404 235/462.1 |
| 2017/0286732 A1* | 10/2017 | Lei | G06F 17/30879 |

* cited by examiner

READING DEVICE AND PORTABLE DEVICE

BACKGROUND OF THE INVENTION

1. Field of the Invention

The present invention relates to a reading device, which is to be used for a portable device such as a portable terminal, a mobile phone and the like, and a portable device having the same.

2. Description of the Related Art

For example, a reading device that is to be used for a portable device, has a one-dimensional scanner and a two-dimensional scanner and is configured to read information of different labels by the one-dimensional scanner and the two-dimensional scanner has been known (for example, refer to Japanese Patent Application Publication No. 2005-63142A)

According to the reading device of the portable terminal, even though it may be possible to read the information of the different labels by the one-dimensional scanner and the two-dimensional scanner, it is not possible to read the information of one label and an image of the label at the same time.

SUMMARY

A reading device comprises a reading unit configured to illuminate a light beam towards an object to be read, to receive reflected light thereof and to read information of the object to be read, and an imaging unit configured to capture the object to be read as an image. An illumination direction of the light beam from the reading unit and an imaging direction of the imaging unit are set to be same.

BRIEF DESCRIPTION OF THE DRAWINGS

The present invention will be further understood with reference to explanations to be described later in connection with the drawings.

DETAILED DESCRIPTION OF EMBODIMENTS

Hereinafter, an embodiment in which the present invention is applied to a portable terminal will be described with reference to FIGS. 1 to 6.

Figure 1:
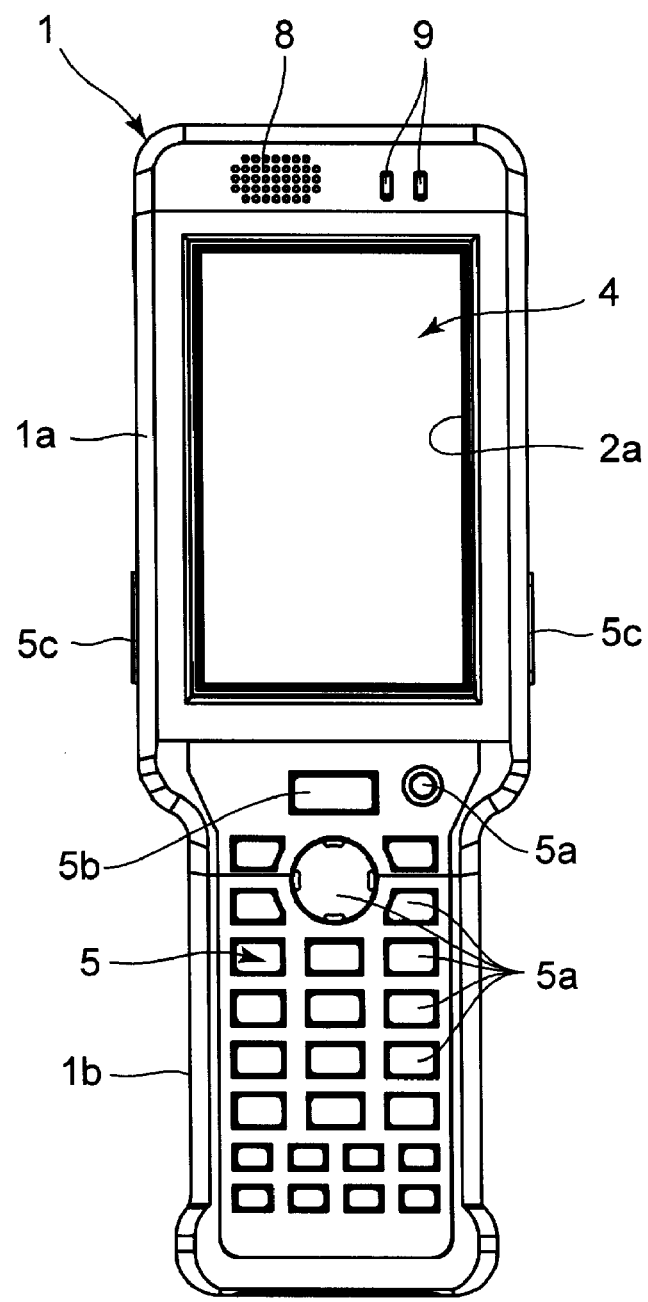
FIG. 1 is a front view depicting an embodiment in which the present invention is applied to a portable terminal.
Figure 2:
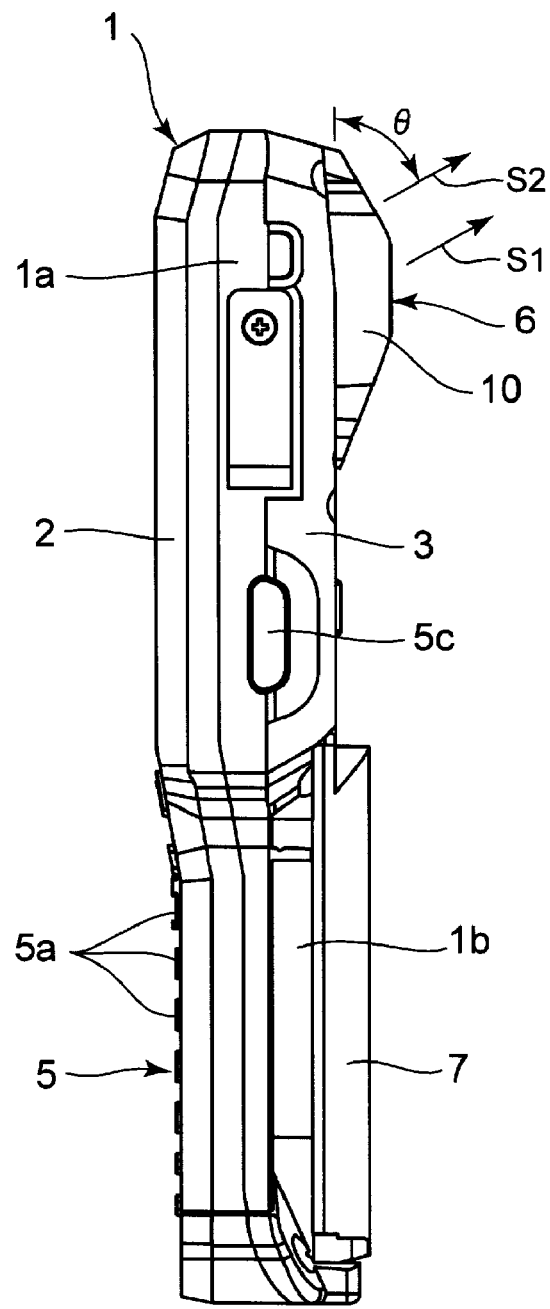
FIG. 2 is a side view of the portable terminal shown in FIG. 1.
Figure 3:
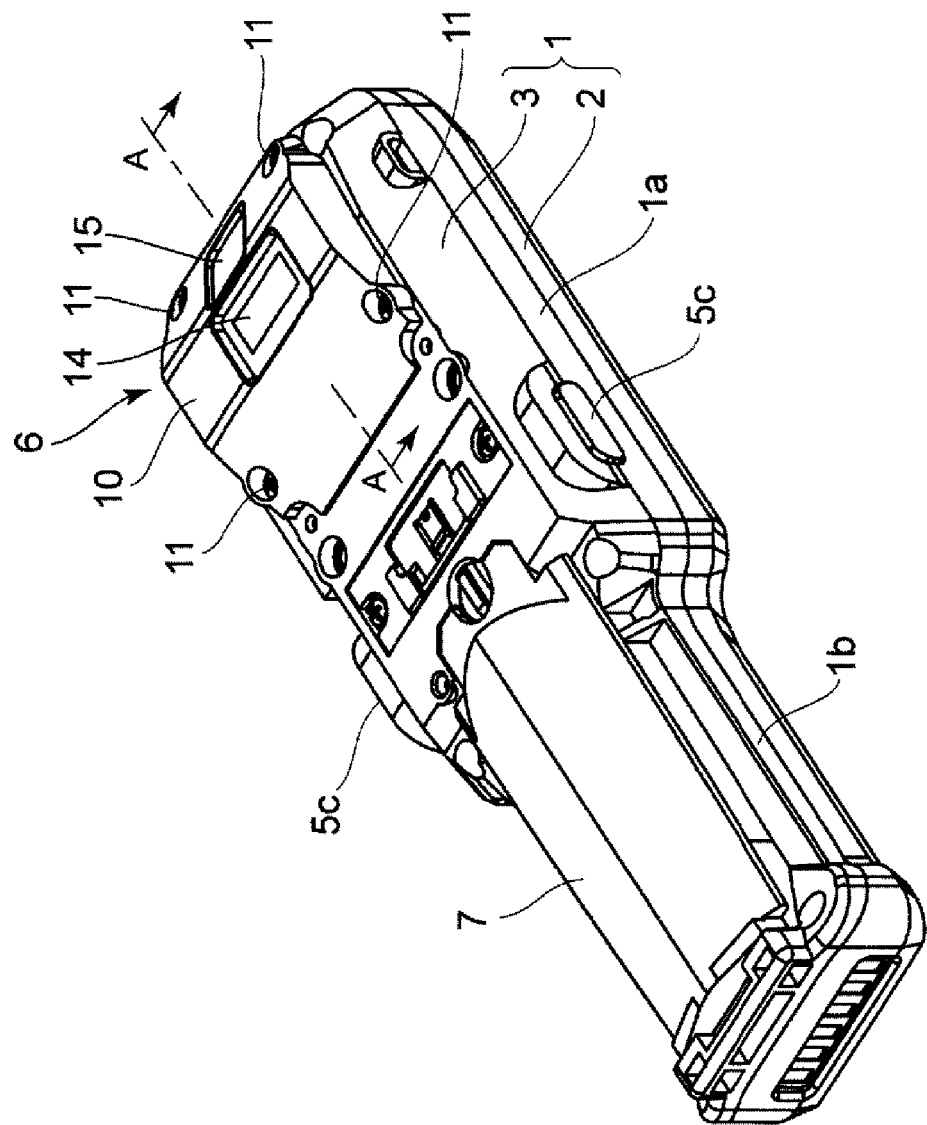
FIG. 3 is a perspective view depicting a back surface-side of the portable terminal shown in FIG. 1.

As shown in FIGS. 1 to 3, the portable terminal includes a device case 1. The device case 1 has an upper case 2 and a lower case 3. The upper case 2 is provided with a display unit 4 and an input unit 5. The lower case 3 is provided with a reading device 6 and a battery cover 7.

As shown in FIGS. 1 to 3, the device case 1 has a configuration where a tip end portion-side (an upper part-side in FIG. 1) positioned at the display unit 4-side of the upper case 2 and the reading device 6-side of the lower case 3 corresponding to the display unit-side is formed at a rectangular main body part 1a, which is long in a front and rear direction (an upper and lower direction in FIG. 1). A front side (a lower part-side in FIG. 1) positioned at the input unit 5-side of the upper case 2 and the battery cover 7-side of the lower case 3 corresponding to the input unit-side is formed at a rectangular gripping part 1b, which is long in the front and rear direction.

That is, as shown in FIGS. 1 to 3, the device case 1 has a configuration where a length (width) of the gripping part 1b in a direction perpendicular to a longitudinal direction of the device case 1 is shorter than a length (width) of the main body part 1a in the direction perpendicular to the longitudinal direction of the device case 1. Thereby, the device case 1 is entirely formed to have a substantial battledore shape. That is, the device case 1 is formed so that an area of an upper surface of the main body part 1a is greater than an area of an upper surface of the gripping part 1b and the gripping part 1b can be easily gripped.

As shown in FIG. 1, the display unit 4 is a planar display panel such as a liquid crystal display panel, an EL (electro luminescence) display panel or the like, and is configured to electro-optically display information. That is, the display unit 4 is arranged in the upper case 2, in correspondence to a display opening 2a formed in the upper case 2.

Thereby, as shown in FIG. 1, the display unit 4 is configured so that the displayed information can be seen through the display opening 2a from AN outside of the upper case 2. In this case, a part of the upper case 2 positioned at the upper part-side of the display unit 4 is provided with a speaker 8 and a plurality of light emitting elements (LEDs) 9 for indicator.

As shown in FIG. 1, the input unit 5 includes diverse keys 5a such as a ten key, a calculation key, a cursor key, a decision key, a power supply key and the like and the keys are aligned on the upper case 2 positioned at the gripping part 1b-side. The input unit 5 is configured to input the information as the diverse keys 5a are operated. In this case, an upper part of the input unit 5 is provided with a center trigger key 5b. Also, as shown in FIGS. 2 and 3, both side surfaces of the device case 1 are provided with side trigger keys 17b, respectively.

As shown in FIGS. 1 to 3, the reading device 6 is provided on a lower surface (an upper surface in FIG. 3) of the lower case 3 corresponding to a back surface-side of the display unit 4. The battery cover 7 is provided on the lower surface of the lower case 3 corresponding to a back surface-side of the input unit 5. In this case, although not shown, the battery cover 7 is configured to openably and closably block a battery accommodation part provided in the lower case 3 corresponding to the back surface-side of the input unit 5 and configured to accommodate therein a battery.

That is, as shown in FIGS. 2 and 3, the battery cover 7 is formed to have a reverse tub shape having a semicircular section and is configured to cover and block the battery accommodation part in the lower case 3 with a lower part-side (an upper part-side in FIG. 3) being convex. Thereby, the battery cover 7 is formed so that when the battery cover 7 is attached to a lower surface (an upper surface in FIG. 3) of the lower case 3, the gripping part 1b of the device case 1 can be easily gripped.

Figure 4:
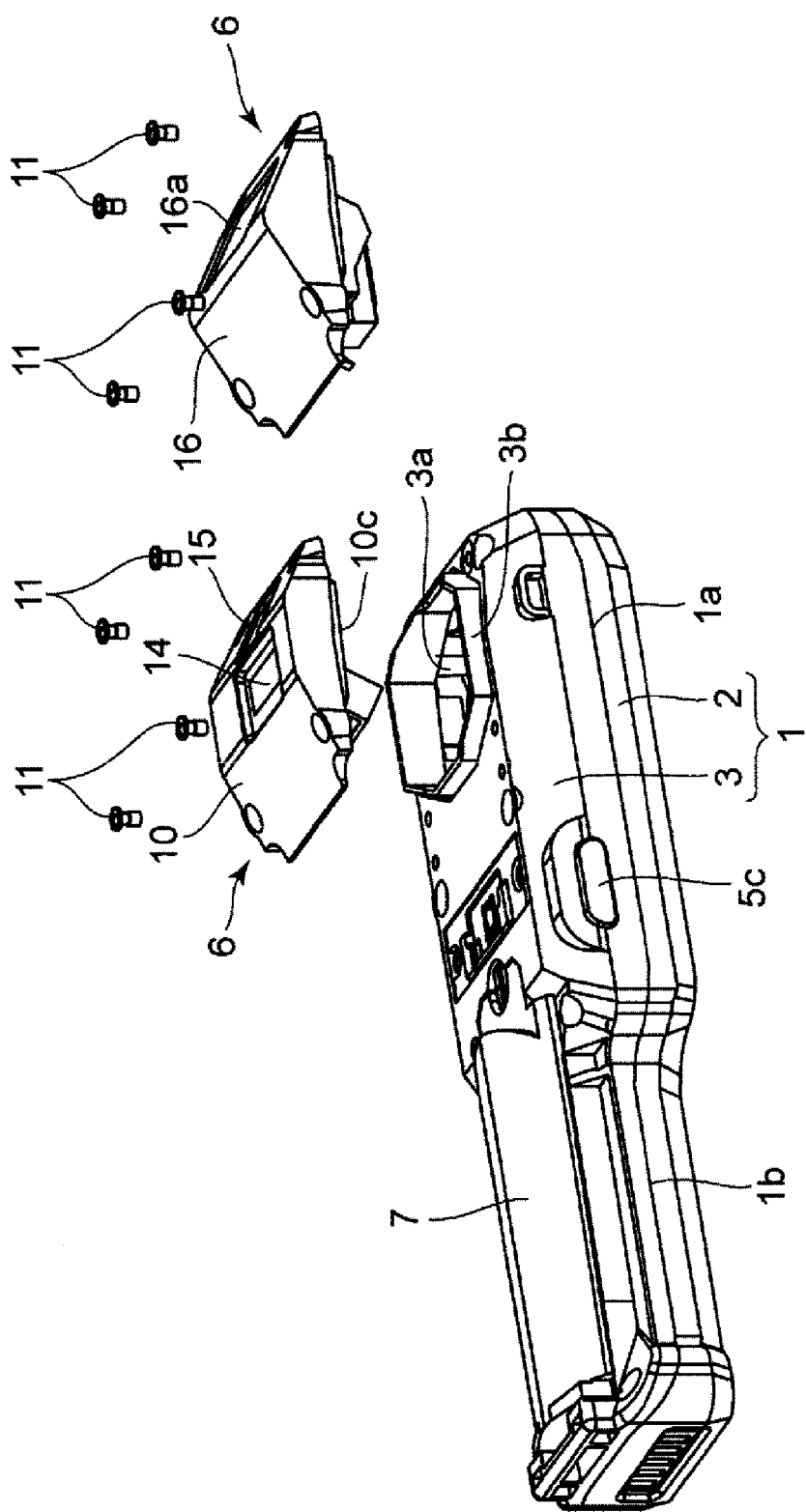
FIG. 4 is an exploded perspective view depicting a device case and a reading device of the portable terminal shown in FIG. 3.
Figure 5:
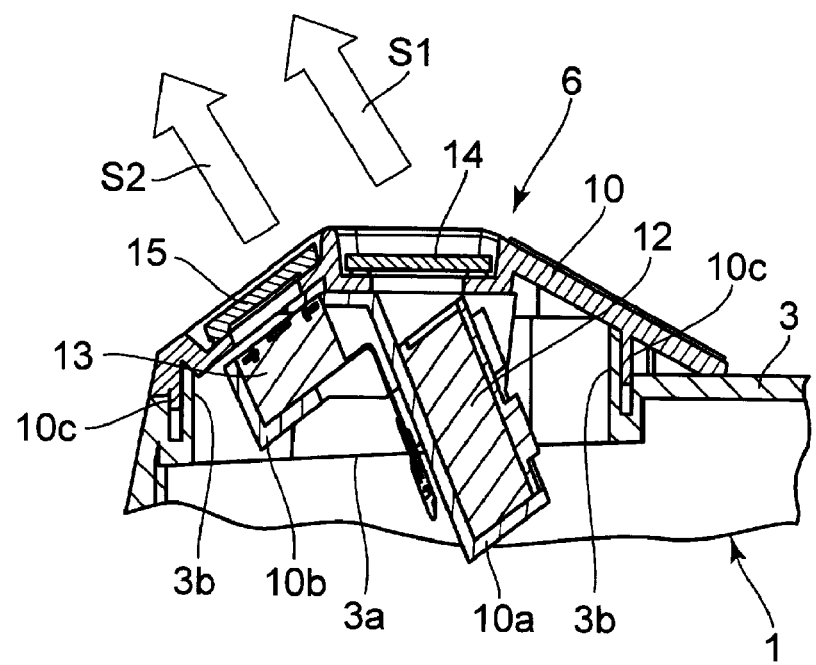
FIG. 5 is an enlarged sectional view taken along an A-A arrow direction of the portable terminal shown in FIG. 3.

In the meantime, as shown in FIGS. 2 to 4, the reading device 6 has a unit case 10. The unit case 10 is configured to be detachably attached to a back surface (an upper surface in FIG. 4) of the lower case 3 by a plurality of screws 11. As shown in FIG. 5, the unit case 10 is configured so that the reading unit 12 and the imaging unit 13 are provided therein.

As shown in FIG. 5, the reading unit 12 is a scanner and is configured to illuminate a light beam such as a laser light beam to an object to be read (not shown), to receive reflected light thereof and to read code information of the object to be read. The imaging unit 13 is a camera having an imaging element and is configured to capture the object to be read, which is to be read by the reading unit 12, as an image. In this case, the object to be read is a label attached to a product, and code information such as a barcode, a two-dimensional code and the like is indicated thereon.

As shown in FIGS. 1 to 5, the code information of the object to be read, which is read by the reading unit 12, is displayed on the display unit 4. Also, the image of the object to be read captured by the imaging unit 13 is displayed on the display unit 4. Thereby, it is possible to perform the reading operation by the reading unit 12 and the capturing operation by the imaging unit 13 at the same time while seeing the code information of the object to be read and the image of the object to be read displayed on the display unit 4.

As shown in FIGS. 2 to 5, the unit case 10 is formed by protruding a rectangular plate into a mountain shape gently inclined in the longitudinal direction of the device case 1. As shown in FIG. 5, the unit case 10 is provided therein with a reading attaching part (a first attaching part) 10a to which the reading unit 12 is attached and an imaging attaching part (a second attaching part) 10b to which the imaging unit 13 is attached.

Also, as shown in FIGS. 4 and 5, the unit case 10 is provided at an outer periphery thereof with a mounting rim 10c and is attached to the lower case 3 by the plurality of screws 11 at a state where the mounting rim 10c is mounted to a frame-shaped edge 3b of an opening 3a formed in the lower surface (an upper surface in FIG. 4) of the lower case 3.

As shown in FIGS. 2 to 5, the unit case 10 is provided with a reading window part 14 corresponding to the reading unit 12 and an imaging window part 15 corresponding to the imaging unit 13. The reading unit 12 and the imaging unit 13 are set so that an illumination direction S1 of the light beam from the reading unit 12 and an imaging direction S2 of the imaging unit 13 are the same, as shown in FIG. 5.

In this case, as shown in FIG. 5, the reading unit 12 is arranged at a state where the illumination direction S1 of the light beam is inclined relative to the reading window part 14. That is, when the illumination direction S1 of the light beam is orthogonal to the reading window part 14, a part of the light beam illuminated to and penetrating the reading window part 14 is reflected on the reading window part 14. Then, the reflected light beam is received at the reading unit 12. Therefore, the reading unit 12 is arranged with the illumination direction S1 of the light beam being inclined relative to the reading window part 14 so that the light beam reflected on the reading window part 14 is not to be illuminated to the reading unit 12.

As shown in FIG. 5, the imaging unit 13 is arranged at a state where the imaging direction S2 is orthogonal to the imaging window part 15. That is, when the imaging direction S2 is inclined relative to the imaging window part 15, the light of the image of the object to be read is refracted at the imaging window part 15, so that the image of the object to be read is read with being distorted. For this reason, the imaging unit 13 is arranged so that the imaging direction S2 is orthogonal to the imaging window part 15.

In this case, as shown in FIGS. 2 to 5, the reading window part 14 is provided at one inclined part of the mountain shape of the unit case 10. Also, the imaging window part 15 is provided at the other inclined part of the mountain shape of the unit case 10. That is, the reading window part 14 is provided at the inclined part of the unit case 10 positioned at the gripping part 1b-side. Also, the imaging window part 15 is provided at the inclined part of the unit case 10 positioned at an opposite side to the gripping part 1b.

Also, as shown in FIGS. 2 and 5, the reading unit 12 and the imaging unit 13 are arranged in the unit case 10 at a state where the illumination direction S1 of the light beam from the reading unit 12 and the imaging direction S2 of the imaging unit 13 are inclined relative to the lower surface of the device case 1, i.e., the lower surface of the lower case 3 by a predetermined angle θ.

That is, the illumination direction S1 of the light beam from the reading unit 12 and the imaging direction S2 of the imaging unit 13 are preferably inclined relative to the lower surface of the lower case 3 within an angle range of 40° to 80°, preferably at an angle of 60° towards a tip end-side (an upper part-side in FIG. 2) of the lower case 3 positioned at an opposite side to the gripping part 1b, as shown in FIGS. 2 and 5.

In this case, as shown in FIG. 4, the reading device 6 has different configurations with respect to code information indicated on the object to be read, for example a barcode and a two-dimensional code. That is, the reading device 6 configured to read a barcode has a configuration where the reading unit 12 and the imaging unit 13 are incorporated in the unit case 10. Also, the reading device 6 configured to read a two-dimensional code has a configuration where only an imaging unit (not shown) is incorporated in the other unit case 16.

For this reason, as shown in FIG. 4, the reading device 6 is configured so that the two types of the unit cases 10, 16 can be replaced. That is, one unit case 10 configured to read a barcode is provided with the reading window part 14 corresponding to the reading unit 12 and the imaging window part 15 corresponding to the imaging unit 13, as described above.

In the meantime, as shown in FIG. 4, the other unit case 16 configured to read the two-dimensional code has an outer periphery shape having the same size as the one unit case 10 configured to read a barcode, and is configured to be attached to the lower case 3 by the screws 11, like the one unit case 10.

That is, as shown in FIG. 4, the other unit case 16 configured to read a two-dimensional code is configured so that an attachment position to the lower case 3 is the same as an attachment position at which the one unit case 10 configured to read a barcode is to be attached the lower case 3.

Also, as shown in FIG. 4, the other unit case 16 configured to read a two-dimensional code is formed to have a mountain shape higher than the one unit case 10 configured to read a barcode and only an imaging window part 16a corresponding to the imaging unit (not shown) is provided at one inclined part of the mountain shape.

In this case, as shown in FIG. 4, the other unit case 16 configured to read a two-dimensional code is configured so that an imaging direction of the imaging unit is the same as the imaging direction S2 of the one unit case 10 configured to read a barcode, i.e., is inclined relative to the lower surface of the lower case 3, which is the lower surface of the device case 1, by the predetermined angle θ.

Thereby, as shown in FIG. 4, the reading device 6 is configured to read the code information of the object to be read, on which any one of the barcode and the two-dimensional code is indicated, by replacing the one unit case 10 and the other unit case 16 in correspondence to a code type of the object to be read.

Figure 6:
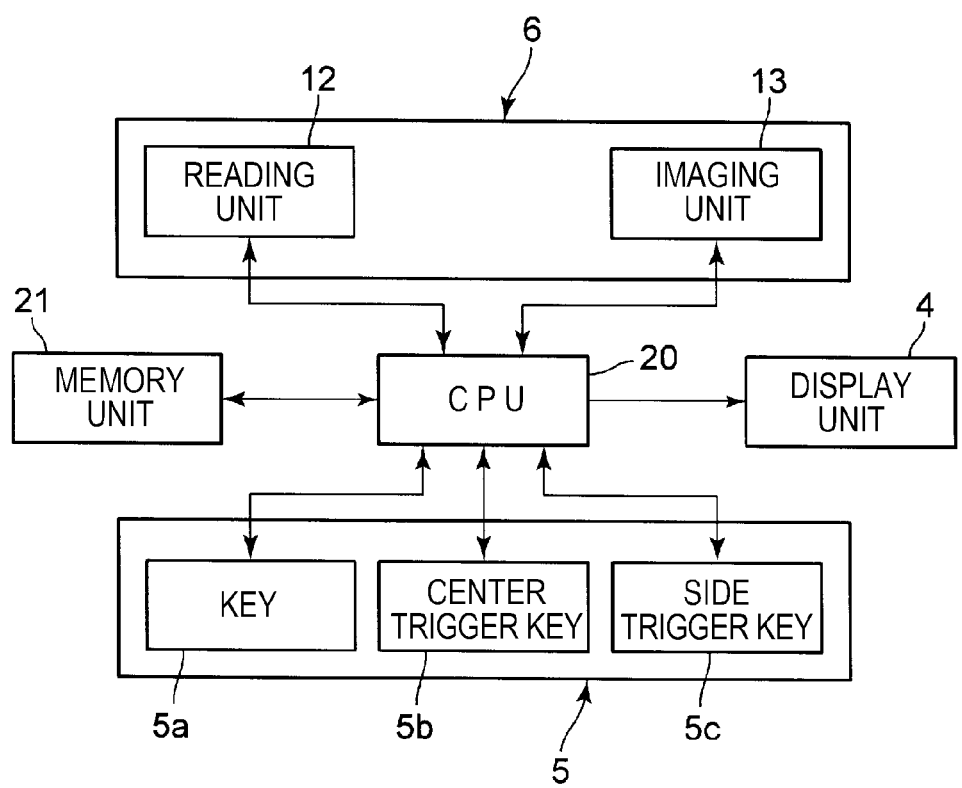
FIG. 6 is a block diagram depicting a circuit configuration of the portable terminal shown in FIG. 1.

In the below, a circuit configuration of the portable terminal is described with reference to a block diagram shown in FIG. 6.

The portable terminal includes a CPU 20, a memory unit 21, the display unit 4, the input unit 5 and the reading device 6. The memory unit 21 includes a ROM (read-only memory) and a RAM (random access memory). The CPU 20 is configured to perform the entire processing of the portable terminal on the basis of a program stored in the ROM of the memory unit 21.

In the ROM of the memory unit 21, a program configured to control the processing that is to be executed by the CPU 20 is stored. The display unit 4 is configured to display a variety of information of goods, stocks thereof and the like, in addition to the code information and the image of the object to be read, based on a command from the CPU 20. The input unit 5 is configured to input the information of goods, stocks thereof and the like by the diverse keys 5a and to input triggers by the center trigger key 5b and the side trigger keys 5c.

The reading device 6 includes the reading unit 12 and the imaging unit 13. When any one of the center trigger key 5b and the side trigger keys 5c is operated, the commands are issued at the same time from the CPU 20, so that the reading unit 12 and the imaging unit 13 are operated. That is, when any one of the center trigger key 5b and the side trigger keys 5c is operated, the reading unit 12 reads the code information of the object to be read such as a label attached to the commercial goods on the basis of the command from the CPU 20 and outputs the read code information to the CPU 20.

When any one of the center trigger key 5b and the side trigger keys 5c is operated, the imaging unit 13 captures the object to be read such as the same label attached to the same commercial goods, as an image, and outputs the captured image to the CPU 20 on the basis of the command from the CPU 20, like the reading unit 12.

Subsequently, effects of the portable terminal configured as described above are described.

When using the portable terminal, first, an operator grips the gripping part 1b of the device case 1 with a hand with the upper case 2 of the device case 1 facing upwards. At this state, the display unit 4 and the input unit 5 of the upper case 2 face upwards.

For this reason, the operator can input information of goods, stocks thereof and the like by operating the diverse keys 5a of the input unit 5 with gripping the gripping part 1b of the device case 1. The input information is displayed on the display unit 4, so that the operator can see the information through the display opening 2a of the upper case 2.

Also, when reading the code information and the image of the object to be read such as a label attached to the commercial goods by the reading device 6, the operator sets the reading window part 14 and the imaging window part 15 of the unit case 10 to face towards the object to be read and operates any one of the center trigger key 5b provided at the upper side part of the input unit 5 and the side trigger keys 5c provided at both sides of the device case 1. Thereby, the reading unit 12 of the reading device 6 reads the code information of the object to be read and the imaging unit 13 captures the object to be read as an image, at the same time.

That is, when the reading unit 12 reads the code information of the object to be read, the reading unit 12 illuminates a light beam such as a laser light beam towards the object to be read, receives the light beam reflected on the object to be read and thus reads the code information of the object to be read. In this case, the reading unit 12 is arranged at the state where the illumination direction S1 of the light beam is inclined relative to the reading window part 14 provided at the unit case 10.

For this reason, when the reading unit 12 illuminates the light beam towards the object to be read, even though a part of the light beam illuminated to and penetrating the reading window part 14 is reflected on the reading window part 14, the reflected light beam is not illuminated towards the reading unit 12, so that the light beam reflected on the reading window part 14 is not illuminated to the reading unit 12. Thereby, the code information of the object to be read is accurately read by the reading unit 12.

Also, when the imaging unit 13 reads the object to be read as an image, the image of the object to be read is read through the imaging window part 15 of the unit case 10 by the imaging unit 13. In this case, the imaging unit 13 is arranged so that the imaging direction S2 is orthogonal to the imaging window part 15. For this reason, the light of the image of the object to be read is refracted at the imaging window part 15 and the image of the object to be read is not distorted, so that the imaging unit 13 can accurately capture the object to be read as an image.

In this way, the code information and the image of the object to be read, which have been read by the reading device 6, are displayed on the display unit 4. For this reason, the operator operates the decision key 5a of the input unit 5 while seeing the code information and the image of the object to be read displayed on the display unit 4, so that the code information and the image of the object to be read displayed on the display unit 4 are stored.

In the meantime, when the code information of the object to be read is a two-dimensional code, it is necessary to replace the reading device 6. That is, the reading device 6 has different configurations with respect to the code information indicated on the object to be read, for example a barcode and a two-dimensional code. For this reason, when reading the two-dimensional code, the operator detaches the one unit case 10 for reading a barcode from the lower case 3 and attaches the other unit case 16 for reading a two-dimensional code to the lower case 3.

In this case, the other unit case 16 has the mountain shape different from the mountain shape of the one unit case 10 but the attachment positions are the same, so that it is possible to easily replace the other unit case with the one unit case 10. Also, the other unit case 16 is arranged so that the imaging direction thereof faces in the same direction as the imaging direction S2 of the one unit case 10. Thereby, it is possible to easily read the code information of the object to be read, on which the two-dimensional code is indicated, by the reading device 6 of the other unit case 16, like the reading device 6 of the one unit case 10.

As described above, according to the portable terminal, the reading device 6 includes the reading unit 12 configured to illuminate the light beam towards the object to be read, to receive the reflected light and to read the code information of the object to be read and the imaging unit 13 configured to capture the object to be read, as an image, and the illumination direction S1 of the light beam from the reading unit 12 and the imaging direction S2 of the imaging unit 13 are set to be the same. Thereby, when reading the code information and capturing the object to be read, it is not necessary to change a direction of the portable terminal.

Thereby, the portable terminal can display the code information and the image of the object to be read, which have been read by the reading device 6, on the display unit 4 at the same time. For this reason, since the operator can see and confirm the code information and the image of the object to be read displayed on the display unit 4, it is possible to accurately and securely read the code information and the image of the object to be read. Thereby, it is possible to easily perform the operation of reading the code information and the image of the object to be read and to improve the reading operability.

In this case, the reading device 6 has the unit case 10 to which the reading unit 12 and the imaging unit 13 are mounted, and the unit case 10 is provided with the reading window part 14 corresponding to the reading unit 12 and the imaging window part 15 corresponding to the imaging unit 13, so that it is possible to securely read the code information of the object to be read through the reading window part 14 of the unit case 10 by the reading unit 12 and to securely capture the object to be read as an image, through the imaging window part 15 of the unit case 10 by the imaging unit 13.

That is, in the reading device 6, the reading unit 12 is arranged so that the illumination direction S1 of the light beam is inclined relative to the reading window part 14, and the imaging unit 13 is arranged so that the imaging direction S2 is orthogonal to the imaging window part 15. Thereby, the reading device 6 can accurately and favorably the code information of the object to be read by the reading unit 12 and to accurately and favorably capture the object to be read, as an image, by the imaging unit 13.

In this case, the reading unit 12 is arranged so that the illumination direction S1 of the light beam is inclined relative to the reading window part 14 provided at the unit case 10. Thus, when illuminating the light beam towards the object to be read, even though a part of the light beam illuminated to and penetrating the reading window part 14 is reflected on the reading window part 14, the reflected light beam is not reflected towards the reading unit 12. For this reason, since the light beam reflected on the reading window part 14 is not illuminated to the reading unit 12, it is possible to accurately and favorably read the code information of the object to be read by the reading unit 12.

Also, the imaging unit 13 is arranged so that the imaging direction S2 is orthogonal to the imaging window part 15. Thus, when reading the object to be read, as an image, the light of the image of the object to be read is refracted at the imaging window part 15, so that the image of the object to be read is not distorted. For this reason, it is possible to accurately and favorably capture the object to be read, as an image, by the imaging unit 13.

In this case, the unit case 10 is formed to have the mountain shape gently inclined in the longitudinal direction of the device case 1, the inclined part positioned at the gripping part 1*b*-side of the device case 1 is provided with the reading window part 14, and the inclined part positioned at the opposite side to the gripping part 1*b* of the device case 1 is provided with the imaging window part 15. Thereby, it is possible to accurately and securely set the illumination direction S1 of the light beam from the reading unit 12 and the imaging direction S2 of the imaging unit 13 to face towards the same direction.

Also, the unit case 10 is detachably attached to the device case 1 by the plurality of screws 11, so that it is possible to easily replace the unit case 10 with the other unit case 16. That is, since the reading device 6 has different configurations with respect to the code information indicated on the object to be read, for example a barcode and a two-dimensional code, when reading the barcode and the two-dimensional code, it is possible to replace the unit cases 10, 16.

In this case, the other unit case 16 configured to read a two-dimensional code has the mountain shape different from the mountain shape of the one unit case 10 configured to read a barcode but the attachment positions are the same, so that it is possible to easily replace the other unit case with the one unit case 10. Thereby, it is possible to read the code information of the object to be read, on which the two-dimensional code is indicated, by the reading device 6 of the other unit case 16, like the reading device 6 of the one unit case 10.

For this reason, according to the reading device 6, when the two types of the unit cases 10, 16 are replaced in correspondence to the code type of the object to be read, it is possible to select which of the object to be read having a barcode indicated thereon and the object to be read having a two-dimensional code indicated thereon is to be read. Also, the reading device 6 can favorably read the code information of the object to be read, on which any one of the barcode and the two-dimensional code is indicated, by the selected case of the unit cases 10, 16.

Also, according to the reading device 6, the illumination direction S1 of the light beam from the reading unit 12 and the imaging direction S2 of the imaging unit 13 are inclined relative to the device case 1 by the predetermined angle θ. Thus, it is possible to accurately and easily set the reading unit 12 and the imaging unit 13 to face towards the object to be read with the operator gripping the device case 1. Thereby, the reading device 6 can securely and favorably read the code information and the image of the object to be read by the reading unit 12 and the imaging unit 13.

In this case, the illumination direction S1 of the light beam from the reading unit 12 and the imaging direction S2 of the imaging unit 13 are inclined relative to the lower surface of the lower case 3 within an angle range of 40° to 80°, preferably at an angle of 60° towards the tip end-side of the device case 1 positioned at the opposite side to the gripping part 1*b* of the device case 1. Thereby, it is possible to further accurately and easily set the reading unit 12 and the imaging unit 13 to face towards the object to be read with the operator gripping the device case 1, so that it is possible to improve the reading operability of the code information and the image of the object to be read by the reading unit 12 and the imaging unit 13.

Meanwhile, in the above embodiment, the reading device 6 has the unit case 10 for reading a barcode and the unit case 16 for reading a two-dimensional code. However, the present invention is not limited thereto. For example, in order to read the object to be read on which other code information is indicated, three types or more of unit cases configured to be replaceable may be provided.

Also, in the above embodiment, the present invention is applied to the portable terminal. However, it is not necessarily required to apply the present invention to the portable terminal. For example, the present invention can be applied to a portable device such as a mobile phone, a portable information terminal and the like.

Although the embodiment of the present invention has been described, the present invention is not limited thereto and is intended to include the inventions defined in the claims and the equivalent range.

The invention claimed is:

1. A portable device comprising:
a device case extending along a longitudinal axis from a first side to a second side, wherein the device case comprises:
a first surface extending along the longitudinal axis; and
a second surface opposite to the first surface, extending along the longitudinal axis,
wherein parts of the first surface and the second surface that are closer to the first side than the second side along the longitudinal axis form a main body, and
wherein parts of the first surface and the second surface that are closer to the second side than the first side along the longitudinal axis form a grip extending along the longitudinal axis;
a display provided on the part of the first surface forming the main body; and
a first reading device comprising:
a first reading device case comprising:
a first part configured to be removably arranged within an opening defined in the part of the second surface that forms the main body; and
a second part having a first mountain shape,
wherein the first mountain shape comprises a first inclined surface and a second inclined surface,
wherein the first inclined surface and the second inclined surface are inclined in the longitudinal axis away from the second surface of the device case, and
wherein the second inclined surface is closer to the first side of the device case than the first inclined surface;
a first reading window arranged on the first inclined surface of the second part of the first reading device;
a first scanner configured to illuminate a light beam towards an object to be read, to receive reflected light thereof and to read information of the object to be read, wherein the first scanner is arranged relative to the first reading window such that an illumination direction of the light beam is inclined relative to the first reading window;
an imaging window arranged on the second inclined surface of the second part of the first reading device; and
a camera configured to capture the object to be read as an image, wherein the camera is arranged relative to the imaging window such that an imaging direction of the camera is orthogonal to the imaging window,
wherein the illumination direction of the light beam from the first scanner and the imaging direction of the camera are set to be same.

2. The portable device according to claim 1,
wherein the illumination direction and the imaging direction are inclined relative to the second surface of the device case by a predetermined angle.

3. The portable device according to claim 1,
wherein the first scanner is a barcode scanner configured to read a one-dimensional code optically.

4. The portable device according to claim 1,
wherein the illumination direction and the imaging direction are set such that a predetermined angle is formed between a direction toward the first side and along the longitudinal axis, and each of the illumination direction and the imaging direction.

5. The portable device according to claim 4,
wherein the predetermined angle is within an angle range of 40° to 80°.

6. The portable device according to claim 5,
wherein the predetermined angle is 60°.

7. The portable device according to claim 1,
wherein a width of the grip along a width axis perpendicular to the longitudinal axis is shorter than a width of the main body along the width axis.

8. The portable device according to claim 1,
wherein the display is configured to display the information of the object to be read, which is read by the first scanner, together with the image of the object to be read, which is captured by the camera.

9. The portable device according to claim 1, further comprising:
a trigger key provided in the grip, wherein the trigger key is configured to receive a trigger input by a user, and
wherein the first scanner is configured to be actuated by the trigger input to read the information of the object to be read, and the camera is configured to be actuated by the trigger input to capture the image of the object to be read.

10. The portable device according to claim 9,
wherein the trigger key is provided in the part of the first surface forming the grip.

11. The portable device according to claim 1, further comprising:
a second reading device comprising:
a second reading device case comprising:
a first part configured to be removably arranged within the opening defined in the part of the second surface that forms the main body; and
a second part having a second mountain shape, wherein the second mountain shape comprises an inclined surface;
a second reading window arranged on the inclined surface of the second part of the second reading device; and
a second scanner configured to illuminate a light beam towards the object to be read, to receive reflected light thereof and to read information of the object to be read,
wherein the first scanner and the second scanner are configured to read different types of codes,
wherein the second scanner is arranged relative to the second reading window such that an illumination direction of the light beam illuminated from the second scanner is inclined relative to the second reading window, and
wherein the illumination direction of the light beam from the second scanner and the illumination direction of the light beam from the first scanner are set to be the same.

* * * * *